United States Patent Office 3,432,592
Patented Mar. 11, 1969

3,432,592
INJECTION-MOULDED ORAL MEDICAMENT IN SOLID FORM
Peter Speiser, Forch, Zurich, Switzerland, assignor to Ciba Corporation, New York, N.Y., a corporation of Delaware
No Drawing. Filed Aug. 28, 1963, Ser. No. 305,182
Claims priority, application Switzerland, Aug. 31, 1962, 10,404/62
U.S. Cl. 424—19     16 Claims
Int. Cl. A61k 27/00, 9/00

The invention relates to injection-moulded medicaments in solid form, more especially for peroral administration, which contain the active substances or mixtures of active substances embedded in a thermoplastic synthetic resin or synthetic resin mixture which is capable of being injection-moulded, physiologically tolerable and at least partially soluble in the digestion juices, and to the manufacture of such forms of medicament.

In order to prepare, for example, peroral, solid medicaments, the active substances have heretofore been mixed by themselves or with known auxiliary substances, such as starch, sugar, talc, taste-correcting agents, etc., aggregated and pressed by means of tabletting presses into generally flat cylindrical shapes of different degrees of porosity. This form of administration represents a further development of individually dosed powders. In comparison with powders it offers many advantages, such as exact dosage, the fact that tablets are taken more readily by patients, better choice of the area of resorption, such as mucous membranes, of the mouth or gastro-intestinal duct by suitable processing. Moreover, tablets are more stable in storage, since the compact mass offers less area of attack to destructive environmental influences than powder. In common with powders, tablets exhibit rapid release of the active substance. In recent times, attempts have been made to control the release of medicinal substances from such solid forms of medicament by the most diverse methods of preparation. Such forms of medicament are known by the name of "retarded-action" tablets. These are intended to deliver their active substances with or without an initial dose, steadily or by stages, for several hours in order to keep the desired blood level as constant as possible. To this end, the medicinal substances are protected with acid-resistant, alkali-soluble coatings against rapid and premature release in the stomach. At first, natural products, such as fats and waxes and then synthetic auxiliary substances, chiefly acrylic and cellulose derivatives, were employed. In a further development of the "retarded-action" forms of medicament, the active substances are mixed with synthetic resins, which are inert and insoluble in the digestion juices, such as PVC or polystyrene, of suitable particle sizes and pressed into tablets by a known method. The soluble medicinal substances diffuses slowly out of the pores of these "framework" tablets.

The medicaments according to the invention have technical, aesthetic and pharmacological advantages. They have a smooth surface with a transparent to opaque appearance and can be colored attractively if required. Moreover, they can be prepared in a form which is inert as regards taste. Preparation is relatively simple and is suitable for large-scale manufacture. Medicaments of this kind can be taken easily even without water. Furthermore, the active substances incorporated in such medicaments frequently prove to be more stable. The surface of these medicaments, which is free from pores in comparison with known forms of medicament, enables the release of the active substances to be varied more readily. They are substantially resistant to atmospheric influences, whereby the packing thereof is also simplified. Owing to the generally slight permeability to water, the new form of administration is moreover also particularly suitable for hygroscopic and/or moisture-sensitive active substances.

According to the invention, the new medicaments contain, sealed into the synthetic resin, which is capable of being injection-moulded any desired, preferably solid, active substances or mixtures of active substances. Advantageously, the medicaments are in forms which are suitable in particular for peroral administration, for example in the form of tablets, pills, dragees, capsules, rodlets, granules or in cylindrical disc-shaped or lenticular form. They may contain different active substances or doses of active substances in different segments.

Synthetic resins which can be used are in particular those which have a low softening point, e.g., below about 160° C., preferably within the range of 80 to 140° C. Furthermore, they should be inert in relation to the active substances and be soluble or at least partially soluble in artificial gastric and/or intestinal juice, so that release of the active substances is ensured, and also be resistant to a high relative atmospheric moisture content and to tropical temperatures. As synthetic resins which can be employed according to the invention there may be mentioned, for example, linear polycondensation or, in particular, polyaddition resins, such as polyamides, for example the ultramides, and furthermore preferably polyaddition products obtained from diepoxide compounds and primary alkanolamines, for example 2-amino-2-ethyl-1:3- propanediol, such as the glyptal resins described, for instance, in French Patent No. 1,295,906, granted Aug. 14, 1958 to Ciba Societe Anonyme, i.e., the condensation products of glycerine with phthalic anhydrides, polyurethanes, polymers, such as polyvinyl resins, and polymers with end-position, free or esterified carboxyl or carboxamide groups which, for example, are built up with acrylic acid, acrylic amide or acrylic acid esters, or cellulose derivatives, such as cellulose ethers, for example methyl, benzyl or hydroxyethyl cellulose, or cellulose esters, for example cellulose acetate, cellulose acetobutyrate or mixtures of the above-mentioned groups of synthetic resins.

The mixing ratio of active substance and synthetic resin in the medicaments according to the invention is determined by the dosage of the active substance and the desired rate of release of the latter.

The new medicaments may also contain fillers or swelling substances, such as lactose, starch derivatives, talc, bole, kaolin, Aerosil, as well as electrolytes. To hydrophilise lipophilic substances, surface-active substances, such as fatty alcohols, or fatty acids, may also be admixed. In order to obtain a "retarded" effect, the active substance or substances or portions thereof may also be previously encased in thermoplasts which are difficultly soluble in digestion juices, such as acrylic resin combinations, preferably a copolymer of methylmethanylate and acrylic acid, or waxes or fats. It is also possible to employ a mixture of such more difficultly soluble thermoplasts with more readily soluble synthetic resins, such as polyvinyl pyrrolidone, cellulose derivatives or polyvinyl alcohols as starting materials.

The new medicaments are obtained by heating a mixture of solid medicinal substances with a thermoplastic synthetic resin or synthetic resin mixture which can be injection-moulded, is physiologically tolerable and is at least partially soluble in the digestion juices, or with monomeric initial products of the same, and if required, other auxiliary substances, until the softening temperature of the thermoplasts is reached and by putting the mixture into forms which are suitable for administration to humans or animals, if required with simultaneous polymerisation, by injection moulding. The apparatus customarily employed in the arts of injection moulding, casting or extrusion is employed for this purpose.

The invention is illustrated in the following examples.

EXAMPLE 1

A pulverulent mixture of 60 parts by weight of a synthetic resin consisting of 4 parts of an epoxide compound and 5 parts of 2-amino-2-ethyl-1:3-propanediol and 40 parts by weight of 5 - (1 - cyclohexenyl)-5-ethylcalcium barbiturate of an average particle size of about 200µ is injection-moulded in an apparatus at about 140° C. in cylindrical tablet moulds, the variable plunger of which is adjusted to a gross weight of 200 mg.

The plastic used in this example can be obtained as follows:

4 parts of a polyglycidyl ether obtained by condensation from epichlorohydrin with bis-(p-hydroxy-phenyl)-dimethylmethane in the presence of alkali and which is liquid at room temperature and has an epoxide content of 5.2 epoxide equivalents per kilo, and 5 parts of 2-amino-2-ethyl-1:3-propanediol are mixed at room temperature and heated to about 60° C.

EXAMPLE 2

A pulverulent mixture of 7.5 parts by weight of 1-methyl-2-phenyl-ethylamine sulphate, 10 parts by weight of D-sorbitol and 82.5 parts by weight of the synthetic resin described in Example 1 is worked up in an injection moulding apparatus into octahedral tablets with a gross weight of 300 mg. and having an active substance content of 22.5 mg.

EXAMPLE 3

A pulverulent mixture of 10 parts by weight of 1-methyl-2-phenyl - ethylaminesulphate, 20 parts by weight of D-sorbitol and 70 parts by weight of a synthetic resin obtained from 95% polyvinyl alcohol and 5% polyvinyl acetate ("Movilith D," commercial product of Farbwerke Hoechst AG) is worked up in an injection moulding apparatus into mouldings having a gross weight of 200 mg. and with an active substance content of 20 mg. at a temperature of 135° C.

EXAMPLE 4

A mixture of 65 parts by weight of the synthetic resin employed in Example 1, 20 parts by weight of methyl cellulose and 15 parts by weight of 1-methyl-2-phenyl-ethylamine sulphate which has been brought to a particle size of about 0.5 mm. by sieving is worked up into dragee-shaped tablets having a gross weight of 200 mg. and containing 30 mg. of active substance at a temperature of 145° C.

EXAMPLE 5

A mixture of 15 parts by weight of polyvinyl chloride, 49.3 parts by weight of the synthetic resin employed in Example 1 and 35.7 parts by weight of 6-sulphanilamido-2:4-dimethylpyrimidine which has been brought to a particle size of about 0.5 mm. by sieving is worked up at 160° C. as described in Example 1 into tablets having a gross weight of 700 mg. and containing 250 mg. of active substance.

EXAMPLE 6

A mixture of 70 parts by weight of the synthetic resin employed in Example 1, 15 parts by weight of talc and 15 parts by weight of 1-methyl-2-phenylethylamine sulphate is worked up in the usual manner with ethanol into a crusty granular material, which is dried, homogenised by sieving to a particle size of about 0.5 mm. and injection-moulded at 140° C. as described in Example 1, into rodlets having a gross weight of 200 mg. and containing 30 mg. of active substance.

EXAMPLE 7

A mixture of 20 parts by weight of Vinnapas B5, 30 parts by weight of Vinnapas T1041 (polyvinyl acetates manufactured by Wacker A.G.), 15 parts by weight of D-sorbitol, 15 parts by weight of 1-methyl-2-phenyl-ethylamine sulphate, 10 parts by weight of bolus alba and 12 parts by weight of methyl cellulose with an average molecular weight of 4000 and 8 parts of sodium chloride is homogenised by sieving and worked up in an injection moulding apparatus at 155° C. into tablets having a weight of 200 mg. and with an active substance content of 30 mg.

EXAMPLE 8

A mixture of 30 parts by weight of 5-(1-cyclohexenyl)-5-ethyl-calcium barbiturate, 10 parts by weight of carnauba wax, 10 parts by weight of polyvinyl alcohol, obtainable under trade name of Moviol 30, and 65 parts by weight of polyvinyl acetate, obtainable under the trade name of Vinylite AYAC, is homogenised by sieving and worked up my means of an injection moulding apparatus at 135° C. into tablets with a weight of 150 mg. and an active substance content of 45 mg.

EXAMPLE 9

A mixture of 65 parts by weight of the synthetic resin employed in Example 1, 10 parts by weight of methyl cellulose, 15 parts by weight of sodium chloride and 5 parts by weight of 1-methyl-2-phenyl-ethylamine sulfate, which has been brought to a particle size of about 0.5 mm. by sieving, is worked up at 145° C. into dragee-shaped tablets having a gross weight of 200 mg. and containing 10 mg. of active substance.

EXAMPLE 10

A mixture of 70 parts by weight of the synthetic resin employed in Example 1, 15 parts by weight of talc, 7.5 parts by weight of D-sorbitol, 7.5 parts by weight of 1-methyl-2-phenylmethylamine sulphate and 2 parts by weight of methyl cellulose is worked up in the usual manner with ethanol into a crusty granular material, which is dried, homogenised by sieving to a particle size of about 0.5 mm. and injection-moulded at 140° C., as described in Example 1, into rodlets having a gross weight of 200 mg. and containing 15 mg. of active substance.

EXAMPLE 11

A mixture of 20 parts by weight of benzyl-α-pyridyl-dimethyl-ethylenediamine hydrochloride, 5 parts by weight of dried sodium sulphate and 75 parts by weight of a copolymer of polyvinyl acetate with crotonic acid (92 parts to 8 parts) is brought to a particle size of about 0.5 mm. and then injection-moulded at a temperature of about 120° C. to tablets of a gross weight of 300 mg. containing 60 mg. of active substance.

EXAMPLE 12

A mixture of 10 parts by weight of Vinnapas B5, 30 parts by weight of Vinnapas T1041 (polyvinyl acetates manufactured by Wacker A.G.), 15 parts by weight of D-sorbitol, 15 parts by weight of 1-methyl-2-phenylethyl-amine sulphate, 10 parts by weight of bolus alba, 2 parts by weight of methyl cellulose and 2 parts by weight of sodium sulfate is homogenised by sieving and worked up at 150° C. in an injection moulding apparatus into tablets having a gross weight of 200 mg. and with an active substance content of 30 mg.

EXAMPLE 13

A mixture of 20 parts by weight of benzyl-α-pyridyl-dimethylethylenediamine hydrochloride, 15 parts by weight of sodium sulphate, 5 parts by weight of D-sorbitol and 60 parts by weight of the synthetic resin used in Example 12 is homogenised and is formed at a temperature of about 120° C. in an injection moulding apparatus to a segment of a tablet having the form of a vertically cut cylinder. This segment is completed and made up into the cylindrical form by injection-moulding at a temperature of about 140° C. a mixture of 20 parts by weight of benzyl-α-pyridyl-dimethylethylenediamine hydrochloride, 2 parts by weight of methyl cellulose and 78 parts by weight of the synthetic resin used in Example 1. Instead of moulding in the form of a segment, it may be performed layerwise.

EXAMPLE 14

A mixture of 20 parts by weight of 5-(1-cyclohexenyl)-5-ethyl-calcium barbiturate, 20 parts by weight of carnauba wax, 10 parts by weight of sodium sulphate and 50 parts by weight of polyvinyl acetate, obtainable under the trade name of Vinylite AYAC is homogenised by sieving and worked up by means of an injection moulding apparatus at a temperature of 135° C. into tablets with a weight of 150 mg. and an active substance content of 30 mg.

EXAMPLE 15

A mixture of 7.5 parts by weight of 1-methyl-2-phenyl ethylamine sulphate, 10 parts by weight of D-sorbitol, 30 parts by weight of sodium sulfate and 52.5 parts by weight of the synthetic resin used in Example 11 is homogenised by sieving to a particle size of about 0.5 mm. and injection-moulded at 125° C. into rodlets having a gross weight of 200 mg. and containing 15 mg. of active substance.

EXAMPLE 16

15 parts by weight of 5-(1-cyclohexenyl)-5-ethyl calcium barbiturate, 10 parts by weight of sodium sulphate, 5 parts by weight of mannitol, 20 parts by weight of polyvinyl alcohol, obtainable under the trade name of Moviol 30, and 50 parts by weight of a polyvinylacetate obtainable under the trade name of Vinnapas T1041 of Wacker A.G. are homogenised and the mixture is formed in an injection moulding apparatus at 150° C. to tablets having a weight of 300 mg. and containing 45 mg. of the active substance.

What is claimed is:

1. An injection-moulded medicament in solid form for peroral use, which contains (A) a predetermined, perorally effective, individual dosage quantity of a member selected from the group consisting of (1) an active substance and (2) a mixture of active substances admixed in (B) an individual, injection-moulded, solid, peroral, unit-dosage vehicle in the form of tablets, pills, dragees, capsules, rodlets and the like, said vehicle consisting essentially of a member selected from the group consisting of (1) a thermoplastic synthetic resin and (2) a mixture of thermoplastic synthetic resins, said resin or resins being inert in relation to the active substances, physiologically tolerable and at least partly soluble in the digestion juices and having a softening point within the range of about 80° C. to about 160° C.

2. An injection-moulded medicament as claimed in claim 1 in the form of a member selected from the group consisting of tablets, pills and dragees.

3. A medicament as claimed in claim 1 wherein the active constituents have been previously encased in thermoplasts which are difficultly soluble in digestion juices or waxes or fats, prior to being admixed with said thermoplastic synthetic resin.

4. A medicament as claimed in claim 2 wherein the active constituents have been previously encased in thermoplasts which are difficultly soluble in digestion juices or waxes or fats, prior to being admixed with said thermoplastic synthetic resin.

5. A medicament as claimed in claim 1 wherein the synthetic resins are linear polycondensation or polyaddition resins.

6. A medicament as claimed in claim 2 wherein the synthetic resins are linear polycondensation or polyaddition resins.

7. A medicament as claimed in claim 3 wherein the synthetic resins are linear polycondensation or polyaddition resins.

8. A medicament as claimed in claim 4, wherein the synthetic resins are linear polycondensation or polyaddition resins.

9. A medicament as claimed in claim 1 wherein the synthetic resins are members selected from the group consisting of polyaddition products obtained from diepoxide compounds and primary alkanolamines, of polymers with endpositioned free and esterified carboxyl and carboxamide groups built up with a member selected from the group consisting of acrylic acid, acrylic amide and acrylic acid esters, of polyvinyl alcohols, of polyvinyl acetates, of polymerisates of polyvinyl acetates and crotonic acid.

10. A medicament as claimed in claim 2 wherein the synthetic resins are members selected from the group consisting of polyaddition products obtained from diepoxide compounds and primary alkanolamines, of polymers wtih end-positioned free and esterified carboxyl and carboxamide groups built up with a member selected from the group consisting of acrylic acid, acrylic amide and acrylic acid esters, of polyvinyl alcohols, of polyvinyl acetates, of polymerisates of polyvinyl acetates and crotonic acid.

11. A medicament as claimed in claim 3, wherein the synthetic resins are members selected from the group consisting of polyaddition products obtained from diepoxide compounds and primary alkanolamines, of polymers with end-positioned free and esterified carboxyl and carboxamide groups built up with a member selected from the group consisting of acrylic acid, acrylic amide and acrylic acid esters, of polyvinyl alcohols, of polyvinyl acetates, of polymerisates of polyvinyl acetates and crotonic acid.

12. A medicament as claimed in claim 4 wherein the synthetic resins are members selected from the group consisting of polyaddition products obtained from diepoxide compounds and primary alkanolamines, of polymers with end-positioned free and esterified carboxyl and carboxamide groups built up with a member selected from the group consisting of acrylic acid, acrylic amide and acrylic acid esters, of polyvinyl alcohols, of polyvinyl acetates, of polymerisates of polyvinyl acetates and crotonic acid.

13. A medicament as claimed in claim 1 wherein the synthetic resins are polyaddition products from 4 parts of a polyglycidyl ether obtained by condensation from epichlorhydrine with bi-(p-hydroxy phenyl)-dimethylmethane, and 5 parts 2-amino-2-ethyl-1:3-propane diol.

14. A medicament as claimed in claim 2 wherein the synthetic resins are polyaddition products from 4 parts of a polyglycidyl ether obtained by condensation from epichlorhydrine with bi-(p-hydroxy phenyl)-dimethylmethane, and 5 parts 2-amino-2-ethyl-1:3-propane diol.

15. A medicament as claimed in claim 3 wherein the synthetic resins are polyaddition products from 4 parts of a polyglycidyl ether obtained by condensation from epichlorhydrine with bi-(p-hydroxy phenyl)-dimethylmethane, and 5 parts 2-amino-2-ethyl-1:3-propane diol.

16. A medicament as claimed in claim 4 wherein the synthetic resins are polyaddition products from 4 parts of a polyglycidyl ether obtained by condensation from epichlorhydrine with bi-(p-hydroxy phenyl)-dimethylmethane, and 5 parts 2-amino-2-ethyl-1:3-propane diol.

References Cited

UNITED STATES PATENTS

| | | | |
|---|---|---|---|
| 2,072,302 | 3/1937 | Herrmann et al. | 128—335.5 |
| 2,072,303 | 3/1937 | Herrmann et al. | 128—335.5 |
| 2,146,295 | 2/1939 | Herrmann et al. | 128—335.5 XR |
| 2,149,005 | 2/1939 | Bockmuhl et al. | 167—64 |

(Other references on following page)

UNITED STATES PATENTS

| | | | |
|---|---|---|---|
| 2,538,127 | 1/1951 | Saunders et al. | 167—64 |
| 2,584,166 | 2/1952 | Stevenson et al. | 167—64 |
| 2,854,378 | 9/1958 | Buckwalter | 167—64 |
| 2,975,099 | 3/1961 | Goyan et al. | 167—64 |
| 2,987,484 | 6/1961 | Lundberg et al. | 264—328 XR |
| 3,034,177 | 5/1962 | Hooper | 264—328 XR |
| 3,234,091 | 2/1966 | Lang et al. | 167—64 |
| 2,987,445 | 10/1958 | Levesque | 167—82 |
| 3,087,860 | 4/1963 | Endicott | 167—82 |
| 3,055,433 | 9/1962 | Hiltpold et al. | 167—82 |
| 3,074,852 | 1/1963 | Mayron | 167—82 |
| 3,080,346 | 3/1963 | Schellenberg et al. | 167—82.5 |
| 2,702,264 | 2/1955 | Klaui | 167—82 |

OTHER REFERENCES

Rahm, L. F.: "Developments in Plastics-Molding Equipment," Mechanical Engineering, vol. 60, No. 2, pp. 117–122, February 1938.

Martin et al.: "Remington's Practice of Pharmacy," The Mack Pub. Co., Easton, Pa., 1956, 11th ed., pp. 371–374.

LEWIS GOTTS, *Primary Examiner.*

S. K. ROSE, *Assistant Examiner.*

U.S. Cl. X.R.

264—328